March 25, 1969 — J. L. SZAJNA — 3,434,202
NECK REAMING AND FINISHING TOOLS
Filed March 15, 1966
Sheet 1 of 2
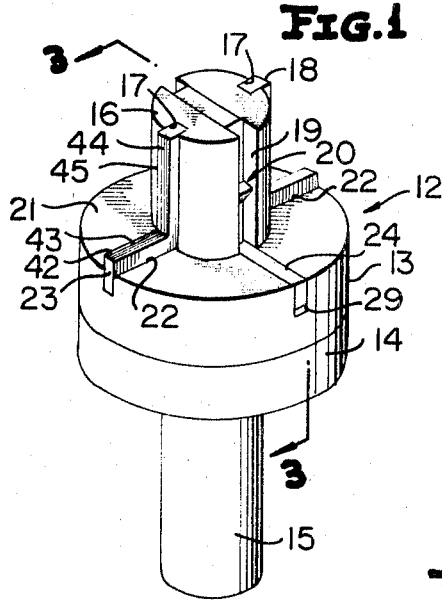
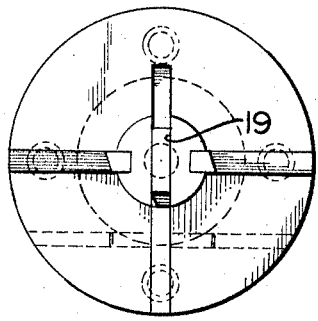
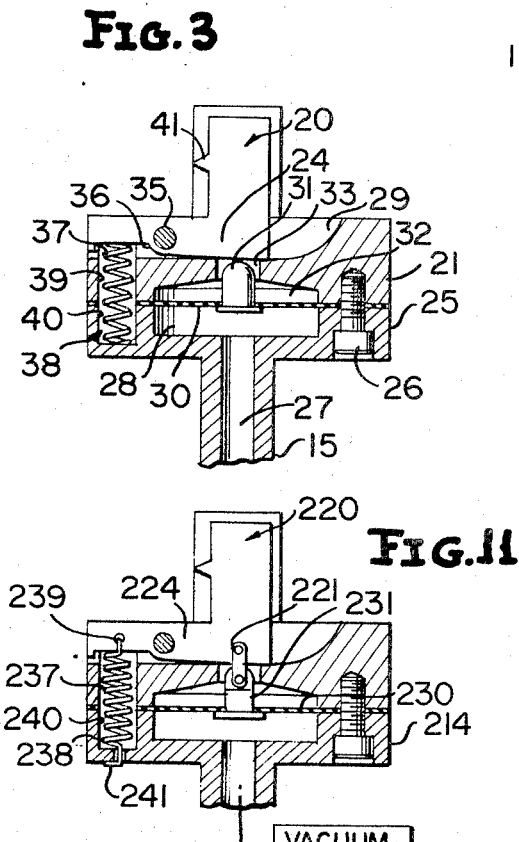
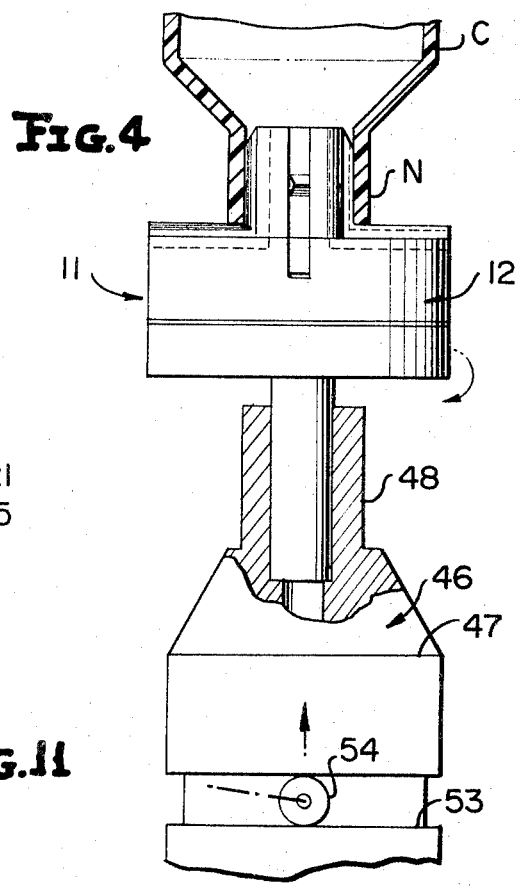
INVENTOR
JOHN L. SZAJNA
BY Mason, Porter, Diller & Brown
ATTORNEYS

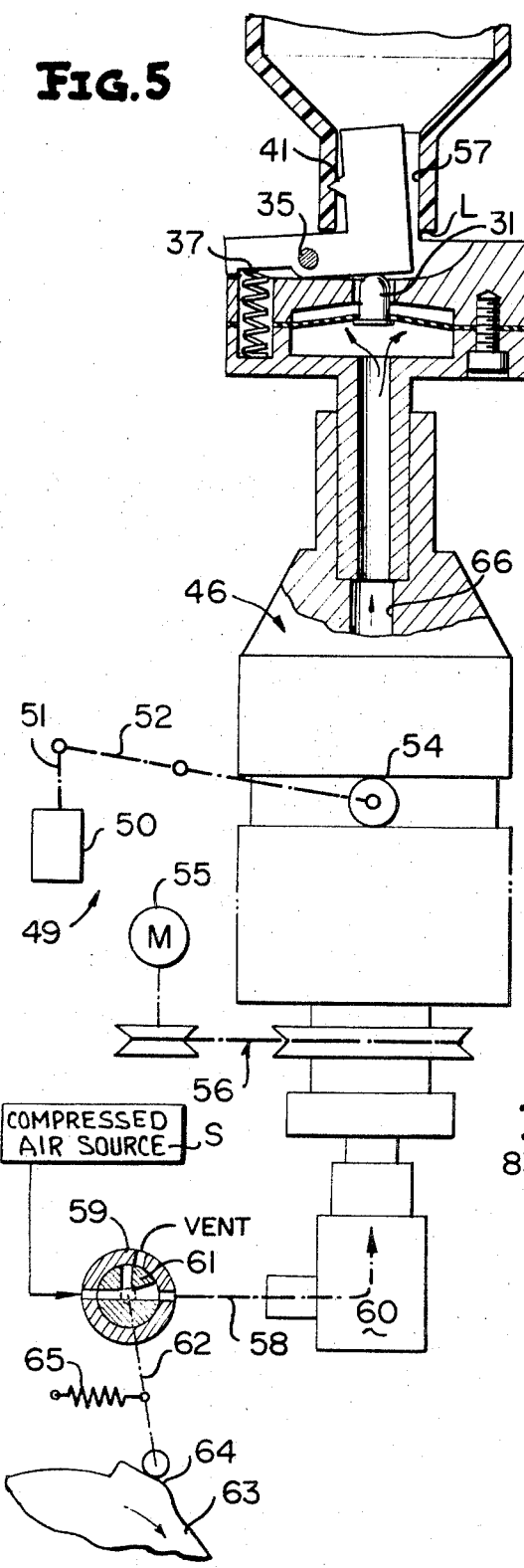
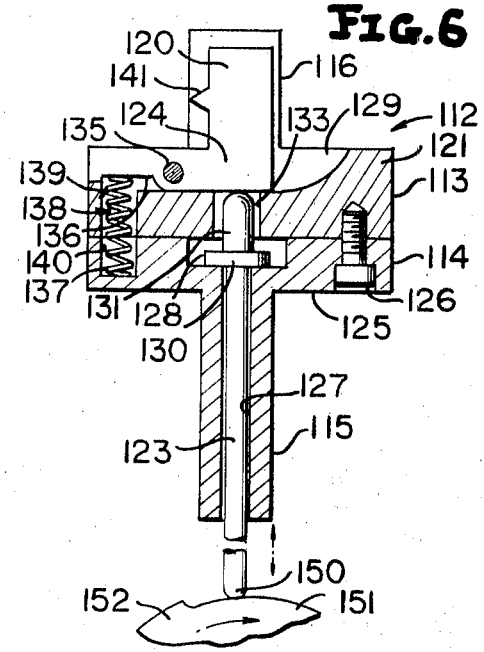
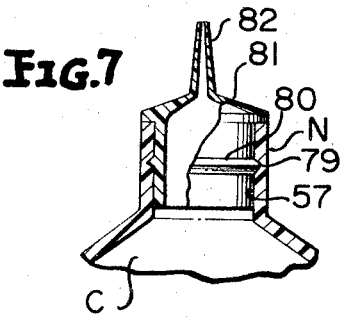
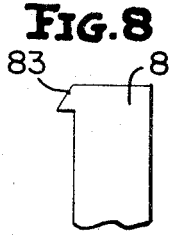
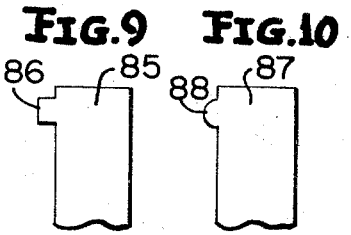
INVENTOR
JOHN L. SZAJNA

United States Patent Office 3,434,202
Patented Mar. 25, 1969

3,434,202
NECK REAMING AND FINISHING TOOLS
John L. Szajna, Norridge, Ill., assignor to Continental Can Company, Inc., New York, N.Y., a corporation of New York
Filed Mar. 15, 1966, Ser. No. 534,454
Int. Cl. B23b 29/02, 47/00; B23d 79/04
U.S. Cl. 29—566                                                    16 Claims

ABSTRACT OF THE DISCLOSURE

A cutting tool for reaming, facing and grooving the necks of bottles is disclosed herein. The tool includes a body having a portion for extension into the neck of a bottle, a pivotally mounted cutting blade for grooving the interior of the neck and a chamber defined by the body and housing blade actuating provisions. The blade actuating provisions are in turn actuated via a passage communicating with the chamber and the exterior of the tool body.

---

This invention relates in general to new and useful improvements in the tool art and more particularly to tools for cutting internal grooves in the necks of bottles while substantially simultaneously performing reaming and facing operations on the bottles.

It is desirable to form internal grooves in the necks of containers at high speeds concurrently with other cutting and finishing operations being performed upon the container necks. In order to satisfactorily accomplish this in a minimum of operating time and to maintain desirable tolerances, it often becomes necessary to perform combined cutting operations with a single tool which will enable the cutting operations to be performed substantially concurrently.

Accordingly, it is an object of this invention to combine separate cutting means in a single tool for reaming, facing and internally grooving containers, such as plastic bottles.

It is another object of this invention to provide a novel tool of the type immediately above-described in which means are included for retaining the groove cutting means in an inoperative position while at least one other of the remaining cutting means are in an operative position, and to provide means to facilitate pivotal movement of the groove cutting means from the inoperative position to an operative position while the other of the cutting means are in the operative position thereof.

It is a further object of this invention to provide a tool including a plurality of cutting means for grooving, reaming and facing the neck of a container, means supporting the groove cutting means for movement between operative and inoperative positions thereof, and pressure differential means acting upon a diaphragm operatively connected to the groove cutting means for moving the latter under the influence of a pressure differential from an inoperative to an operative position, or vice versa, or alternatively, to provide a cam operated plunger element in lieu of the pressure differential to operate the groove cutting means.

It is a further object of this invention to provide a novel tool of the type immediately above described in which the groove cutting means is operative for cutting grooves of varying depth in a container neck.

With the above and other objects in view that will hereinafter appear, the nature of the invention will be more clearly understood by reference to the following detailed description, the appended claims and the several views illustrated in the accompanying drawings.

In the drawings:

FIGURE 1 is a top perspective view of the cutting means of the tool of this invention, and illustrates reaming, facing and groove cutting elements thereof.

FIGURE 2 is a top plan view of FIGURE 1 and illustrates the groove cutting element in the inoperative position thereof.

FIGURE 3 is a cross-sectional view of the cutting means of this invention taken generally along line 3—3 of FIGURE 1, illustrating actuating means for moving the groove cutting element between inoperative and operative positions thereof.

FIGURE 4 is a fragmentary partially schematic side elevation view of the tool with parts broken away for clarity, and illustrates the cutting means affixed to an associated housing and means for rotating and longitudinally moving the tool to perform cutting operations upon a container neck.

FIGURE 5 is a fragmentary partially schematic side elevational view of the tool of FIGURE 4 and illustrates the groove cutting element in its operative position in which the groove cutting element cuts a groove in the container neck, means which include a motor and pulley system for rotating the cutting tool in relation to the container neck, means for applying differential air or other fluid pressure across the chamber to operate the groove cutting element, and means for controlling the differential pressure.

FIGURE 6 is a sectional view taken through another tool along the line corresponding generally to the line 3—3 of FIGURE 1, and illustrates plunger means for actuating a groove cutting element of the tool.

FIGURE 7 is a fragmentary sectional view of the container of FIGURES 4 and 5, and illustrates a dispensing closure inserted into the neck of the container and a rib on a dispensing closure engaging the groove of the container neck.

FIGURES 8, 9 and 10 are fragmentary side elevational views of alternative groove cutting elements and illustrate alternative shapes for forming grooves of various cross-sectional configurations.

FIGURE 11 is a cross-sectional view of a cutting means similar to that of FIGURE 3, but illustrates the operative relation of components of a vacuum-operated embodiment of the tool of this invention.

Referring now to the drawings in detail, reference is made first to FIGURE 1, wherein there is illustrated cutting means generally referred to by the numeral 12 which forms a portion of a tool, generally referred to by the numeral 11. The cutting means 12 includes a first body portion 13, a second body portion 14, and a shaft-like portion 15 extending downwardly from the second body portion 14. The first body portion 13 of the cutting means 12 carries a generally cylindrical member 16 extending upwardly therefrom. The cylindrical member 16 has a pair of identical diametrically disposed grooves 17 extending longitudinally of and disposed circumferentially about the cylindrical member. The cylindrical member 16 also includes a groove 19 passing entirely diametrically through the cylindrical member 16 in a plane generally normal to a plane through the grooves 17. The grooves 17 each receive an identical reaming blade 18 while the groove 19 houses a groove cutting or recess cutting element 20 of the cutting means 12. The first body portion 13 of the cutting means 12 also has a base 21 rigidly connected to the cylindrical member portion 16. The base 21 has a pair of identical grooves 22 disposed radially across an outer upper face (unnumbered) of the base. The grooves 22 receive a plurality of identical facing means or blades 23, while a pivot-like portion 24 of the groove cutting element is housed in a groove 29 of the base 21. As is illustrated in FIGURE 1 the grooves 17 and 22 lie in a common plane as do the grooves 19 and 29.

FIGURES 2 and 3 illustrate more clearly the manner in which first and second body portions 13 and 14 of the cutting means 12 are secured together at their bases 21 and 25, respectively, by means of bolt or screw members 26 extending through the base 25 and threaded into the base 21. The shaft-like portion 15 depends from the base 25 and has an inner bore or passageway 27 which creates a hollow passage through the shaft-like portion 15 into a chamber 28. The chamber 28 is enlarged relative to the passageway 27 and occupies a large volume within the base 25. The inner portion of the base 21 includes a chamber 32 axially aligned with the chamber 28 and a passageway 33 in communication with the groove 29. A diaphragm 30 is disposed between the bases 21 and 25 and has connected centrally thereto a protrusion 31. The diaphragm 30 is secured between the bases 21, 25 in a manner readily apparent from FIGURE 3 of the drawings. The protrusion 31 is positioned within the passageway 33 beneath the pivot leg portion 24 of the groove cutting element 20. The pivot leg portion 24 of the groove cutting element 20 is pivotally connected to the base 21 by means of a pin 35 extending through the pivot leg portion 24 across the groove 29 and affixed to the base 21. A lower edge (unnumbered) of the pivot leg portion 24 of the groove cutting element 20 has a depression 36 therein to receive a spring 37, or other such biasing means. The spring 37 is primarily housed in a depression or housing 38 defined by axially aligned bores or holes 39 and 40 in the base 21, 25, respectively, and a hole (unnumbered) in the diaphragm 30. The spring 37 is generally of the compression type, and serves to exert a force on the pivot leg 24 to retain the groove cutting element 20 in the inoperative non-cutting position, which is best shown in FIGURES 1–3 of the drawings. However, the spring 37 may also be a tension spring, and thus serves to retain the groove cutting element 20 in the operative cutting position, the latter position of the element 20 being best shown in FIGURE 5. The groove cutting element 20 has positioned at a radial outermost side edge thereof a cutting blade 41 which in its normal position is substantially recessed behind the outer periphery of the upstanding cylindrical member 16.

The facing means or blades 23 has a slanted cutting face 42 terminating in a cutting edge 43. Similarly, the reaming blades 18 have tapered outer faces 44 terminating in cutting edges 45.

The cutting means 12 is connected to a housing 46 having a base portion 47 and a tubular extension 48. The housing 46 is rotated and reciprocated by means, generally referred to by the reference numeral 49. The means 49 includes a piston cylinder 50, a piston (not shown), and a piston rod 51 for actuating a pivoted lever mechanism 52 to exert an axial force on the base portion 47 of the housing 46. The lever mechanism 52 is operatively connected to the housing 46 by means of a roller 54 of the mechanism 52 received in a circumferential slot 53 of the housing 46. The axial motion of the housing 46 moves the cutting means 12 into cutting engagement with a neck N of an inverted container or bottle C, in a manner to be described more fully hereafter.

As is illustrated in FIGURE 5 of the drawings, the housing 46 is rotated by a motor 55 through a conventional pulley belt drive system 56, or other such appropriate means, whereby the cutting means 12 carried by the housing 46 rotates relative to the container C. With the cutting means 12 positioned relative to the container C, as shown in FIGURES 4 and 5, an interior surface 57 of the neck N is reamed by the action of the rotating reaming blades 18. The facing blades 23 also "face" a lip L of the container neck N during this rotation of the cutting means 12.

While the reaming blades 18 are within the neck N of the container C, each reaming blade 18 defines a volume by its rotation having a diameter which is greater than the diameter of the volume defined by the rotation of the groove cutting element 20 in its inoperative position (FIGURES 2 and 3). In this manner, the groove cutting element 20 is confined in its inoperative position within the volume defined by the reaming blades 18 and projects beyond this latter volume only in the operative position thereof. The cutting blade 41 of the groove cutting element 20 engages the interior surface 57 of the neck N of the container C while the tool 11 is rotating within the container neck N, during or immediately after the reaming and facing operations are performed by the reaming and facing blades 18 and 23, respectively. As the facing blades 23 complete their facing of the lip L of the container neck N, the cutting blade 41 of the groove cutting element 20 may engage the interior surface 57 of the container neck N at the desired distance within the container neck N, as measured from the "faced" lip L of the container neck N.

The groove cutting element 20 is moved from the inoperative to the operative position thereby by pressurized air which passes from a suitable compressed air source S through a valve 59, a conduit 58, and a rotatable connection 60 into the housing 46 of the tool. The pressurized air flow is controlled by the rotation of valve spool 61 of the valve 59 by the action of a lever 62 or a similar linkage under the influence of a rotating cam 63 having a cam lobe 64 thereon. The lever 62 is spring-biased by a spring 65 to a position at which the valve 59 is closed blocking the flow of air from the compressed air source S and air from the housing 46 is vented to the atmosphere. In the open position of the valve 59 which is illustrated in FIGURE 5 of the drawings, the vents (unnumbered) are closed to atmosphere and air flows into the housing 46 in the manner heretofore described. The housing 46 includes a cavity 66 through which the air passes and enters the chamber 28 via the passageway 27. The pressurized air within the chamber 28 causes the diaphragm 30 to expand outwardly in the direction of the groove cutting element 20. The protrusion 31 attached to the diaphragm 30 is thereby moved into abutment with the lowermost edge of the groove cutting element 20 and causes the groove cutting element 20 to rotate or pivot about the pin 35 against the force of the spring 37, whereby the groove cutting element 20 is moved from the inoperative position inside the volume created by the reaming blades 18 to the operative position as shown in FIGURE 5. The movement of the groove cutting element 20 forces the cutting blade 41 into engagement with the internal surface 57 of the container neck N and forms a circumferential groove 79 as the tool 11 rotates.

FIGURE 6 illustrates another embodiment of a cutting means 112 of the tool of this invention including a first body portion 113, a second body portion 114, and a shaft-like portion 115 rigidly connected to a base 125 of the second body portion 114. The first body portion 113 of the cutting means 112 also has a base 121 rigidly connected to a cylindrical member 116. The base 121 has identical grooves (not shown) disposed radially across an outer upper face of the base, to receive a plurality of facing blades (not shown) and the cylindrical member 116 has a pair of diametrically disposed grooves (not shown) extending longitudinally of the cylindrical member 116 in a manner similar to that of the cutting means 12. A pivot leg portion 124 of a groove cutting element 112 is housed in a groove 129 of the base 121 and an upper portion of the groove cutting element 120 is received in a slot (not shown) through the cylindrical member 116 in a manner generally similar to that of the cutting means 12. The first and second body portions 113 and 114, respectively, of the cutting means 112 are secured together at their bases 121 and 125, respectively, by means of bolt or screw members 126 extending through the base 125 and threaded into the base 121. The shaft-like portion 115 depends from the base 125 and has an inner bore or passageway 127 which creates a hollow passage through the shaft-like portion 115 into a chamber 128. The inner portion of the base 121 includes a passageway 133 beneath the pivot leg portion 124 of the groove cutting element 120 and communicates with the groove 129. A protrusion 131 is positioned within the passageway 133 and has a collar 130 rigidly attached thereto and housed within the chamber 128. A plunger 123 extends from the collar 130 through the passageway 127, and is operatively disposed through a housing (not shown) in a manner to provide longitudinal motion to the protrusion 131. The pivot leg portion 124 of the groove cutting element 120 is pivotally connected to the base 121 by means of a pin 135 extending through the pivot leg portion 124 across the groove 129 and affixed to the base 121. A lower edge (unnumbered) of the pivot leg portion 124 of the groove cutting element 120 has a depression 136 therein to receive a spring 137, or other such biasing means. The spring 137 is primarily housed in a depression or housing 138 defined by axially aligned bores or holes 139 and 140 in the base 121, 125, respectively. The spring 137 is generally of the compression type, and serves to exert a force on the pivot leg 124, to retain the groove cutting element 120 in the inoperative position. However, the spring 137 may also be a tension spring and, thus, serve to retain the groove cutting element 120 in the operative cutting position. The groove cutting element 120 has positioned at a radial outermost side edge thereof a cutting blade 141 which in its normal position is substantially recessed behind the outer periphery of the upstanding cylindrical member 116.

The cutting means 112 is carried by a housing 146 (not shown) and is subject to rotation in a manner generally similar to that of the cutting means 12. A lower end portion 150 of the plunger 123 extends entirely through the body or housing and receives longitudinal motion from a cam 151 having a cam lobe 152 thereon. The longitudinal motion of the plunger 123 moves the plunger relative to the shaft-like portion 115, and thereby causes the protrusion 133 to be moved into abutment with the lowermost edge of the groove cutting element 120 and causes the groove cutting element 120 to rotate or pivot about the pin 135, against the force of the spring 137, whereby the groove cutting element 120 is moved from an inoperative position to an operative position. The collar 130 of the plunger 123 moves longitudinally within the chamber 128 and is limited in its motion therein by the lower central portion of the base 113 and the upper central portion of the base 114.

FIGURE 7 illustrates the container C provided with a dispensing closure 81 interlocked with the container neck N by means of a peripheral rib 80 reecived in the groove 79. The rib 80 is an integral portion of a peripheral skirt of the dispensing closure 81 which also has a dispensing neck 82 to facilitate emptying the contents (not shown) of the container C.

The container and closure illustrated in FIGURE 7 is representative of a groove 79 formed by the groove cutting element 20 having a V-shaped cutting blade 41. The peripheral rib 80 of the closure skirt is likewise of V-shape to engage the groove 79 in mating relation thereto.

FIGURE 8 illustrates a portion of a groove cutting element 84 including a cutting blade 83. However, the cutting blade 83 is disposed at the upper end of the groove cutting element 84 as opposed to the generally central location of the cutting blade 41. This construction permits the cutting of groove 79 at different axial distances longitudinal from the lip L of the container neck N. This feature is accomplished by using the appropriate groove cutting elements, which has the cutting blades such as 41 or 83 located at the appropriate position of the groove cutting element to position the annular groove 79 where desired.

FIGURE 9 illustrates another groove cutting element 85 which has a groove cutting blade 86 of an alternative configuration which produces a groove of a corresponding cross-sectional shape. The square cross-section 86 of the groove cutting blade of the cutting element 85 is appropriate for cutting square cross-sectional shaped annular grooves in the neck N of the container C.

FIGURE 10 illustrates yet another cross-sectional shape of a cutting blade 88 which is of a semi-circular cross-section. The cutting blade 88 forms a portion of a cutting element 87. The semi-circular groove cutting blade facilitates the cutting of semi-circular annular grooves in the neck N of the container C.

The positive air supply which actuates the diaphragm 30 in opposition to the force exerted by the compression spring 37 may be replaced by a low pressure or vacuum source V which would operate to draw a diaphragm 230 downwardly, thereby also drawing a protrusion 231 downwardly, as shown in FIGURE 11. If a vacuum source V were used, the protrusion 231 would then be attached in a suitable manner to the lower surface of the pivot leg portion 224 of the groove cutting element 220 as by means of a pin-pivoted link 221. The vacuum source V would supply sufficient suction to overcome the force of a tension spring 237 located in the depression 238. The tension spring would be appropriately connected by suitable end fastening means 239, 241 to constantly force the groove cutting element 220 to the operative position. One end of the tension spring 237 would necessarily be connected to the pivot leg portion 24 of the groove cutting element 220 by means 239, while the other end of the tension spring would be connected to the bottom of a bore 240 of a second body portion 214 by means 241.

Although only preferred embodiments of the invention have been illustrated and described herein, it is to be understood that minor modifications may be made in the tool of this invention within the spirit and scope of this invention, as defined in the appended claims.

I claim:

1. A recessing tool comprising a body including first and second fixedly interconnected body portions, cutting means carried by said body, said cutting means including a cutter for forming a circumferential recess in a surface of a bottle neck, said recess forming cutter including a cutter blade, means mounting said cutter blade on said first body portion for movement between an inoperative non-cutting position and an operative cutting position, said body including chamber means, means within said chamber means movable with respect to both said first and second body portions for actuating said cutter blade between the inoperative and operative positions thereof, said second body portion defining means communicating with said chamber to allow actuation of said means for actuating from the exterior of said body.

2. A facing, reaming and recessing tool comprising a body, a plurality of cutting means carried by said body, said plurality of cutting means including a cutter for facing a bottle neck lip, a cutter for reaming an interior surface of the bottle neck and a cutter for forming a circumferential recess in the interior surface of the bottle neck, said recess forming cutter including a cutter blade, said body supporting said cutters for facing and reaming, and mounting said cutter blade for movement between an inoperative non-cutting position and an operative cutting position, said cutter blade in the non-cutting position thereof being housed within a volume defined by the rotation of said reaming cutter and being movable beyond said volume in the cutting position thereof, said body including chamber means, means within said chamber means movable with respect to said body for actuating said cutter blade between the inoperative and operative positions thereof, and means fixedly attached to said body defining means communicating with said chamber for actuation of said means within said chamber from the exterior of said body.

3. A recessing tool comprising a body, cutting means carried by said body, said cutting means including a cutter for forming a circumferential recess in a surface of a bottle neck, said recess forming cutter including a cutter blade, means mounting said cutter blade for movement between an inoperative non-cutting position and an operative cutting position, said body including chamber means, and means operative through said chamber means for actuating said cutter blade between the inoperative and operative positions thereof, said operative means including a diaphragm in said chamber means, one side of said diaphragm being operatively coupled to said cutter blade, and an opposite side of said diaphragm being subjected to a fluid media force whereby movement of said diaphragm causes the actuation of said cutter blade from the inoperative to the operative positions thereof.

4. A recessing tool comprising a body, cutting means carried by said body, said cutting means including a cutter for forming a circumferential recess in a surface of a bottle neck, said recess forming cutter including a cutter blade, means mounting said cutter blade for movement between an inoperative non-cutting position and an operative cutting position, said body including chamber means, and means operative through said chamber means for actuating said cutter blade between the inoperative and operative positions thereof, said operative means including a diaphragm in said chamber means, one side of said diaphragm being operatively coupled to said cutter blade, means urging said diaphragm to a position at which said cutter blade is in the operative position thereof, vacuum means in communication with an opposite side of said diaphragm, and means for selectively applying a vacuum to said opposite side whereby said cutter blade is moved from the operative to the inoperative position thereof.

5. The tool as defined in claim 1 wherein said mounting means mount said cutter blade for pivoting movement between said cutting and non-cutting positions, and said operative means includes an element mounted for reciprocal movement in said chamber means.

6. A recessing tool comprising a body, cutting means carried by said body, said cutting means including a cutter for forming a circumferential recess in a surface of a bottle neck, said recess forming cutter including a cutter blade, means mounting said cutter blade for movement between an inoperative non-cutting position and an operative cutting position, said body including chamber means, and means operative through said chamber means for actuating said cutter blade between the inoperative and operative positions thereof, said operative means including a diaphragm in said chamber means, one side of said diaphragm being operatively coupled to said cutter blade, and an opposite side of said diaphragm being subjected to a fluid media force whereby movement of said diaphragm causes the actuation of said cutter blade from the inoperative to the operative positions thereof.

7. A recessing tool comprising a body, cutting means carried by said body, said cutting means including a cutter for forming a circumferential recess in a surface of a bottle neck, said recess forming cutter including a cutter blade, means mounting said cutter blade for movement between an inoperative non-cutting position and an operative cutting position, said body including chamber means, and means operative through said chamber means for actuating said cutter blade between the inoperative and operative positions thereof, said operative means including a diaphragm in said chamber means, one side of said diaphragm being operatively coupled to said cutter blade, means urging said diaphragm to a position at which said cutter blade is in the operative position thereof, vacuum means in communication with an opposite side of said diaphragm, and means for selectively applying a vacuum to said opposite side whereby said cutter blade is moved from the operative to the inoperative position thereof.

8. The tool as defined in claim 2 wherein said mounting means mount said cutter blade for pivoting movement between said cutting and non-cutting positions, and said operative means includes an element mounted for reciprocal movement in said chamber means.

9. A recessing tool comprising a body, cutting means carried by said body, said cutting means including a cutter for forming a circumferential recess in a surface of a bottle neck, said recess forming cutter including a cutter blade, means mounting said cutter blade for movement between an inoperative non-cutting position and an operative cutting position, said body including chamber means, and means operative through said chamber means for actuating said cutter blade between the inoperative and operative positions thereof, said mounting means mounting said cutter blade for pivoting movement between said cutting and non-cutting positions, said operative means including an element mounted for reciprocal movement in said chamber means, said element being carried by a diaphragm, and means for deflecting said diaphragm to a position at which said element urges said cutter blade from the non-cutting to the cutting positions thereof.

10. The tool as defined in claim 5 wherein said element is an elongated rod, said rod including a portion projecting outwardly of said body through said means communicating with said chamber, and means are provided for reciprocating said rod to actuate said cutter blade between the non-cutting and cutting positions thereof independently of movement of said body.

11. The tool as defined in claim 9 wherein means are provided for rotating said tool body.

12. The tool as defined in claim 10 wherein means are provided for rotating said tool body.

13. The tool as defined in claim 1 wherein said cutting means includes a reaming cutting means.

14. The tool as defined in claim 1 wherein said cutting means includes a reaming cutting means and a facing cutting means.

15. A recessing tool comprising a body having an axially extending blade housing member and a radially outwardly extending member, first and second slots in said axially and radially outwardly extending members, respectively, said slots being in communication, a bellcrank-shaped recessing blade lying within both said slots, pivot means pivotally connecting said blade with said radially outwardly extending portion, means biasing said blade to a first pivoted position, and reciprocable means housed within said body in driving relation with said blade to drive said blade to a second pivoted position.

16. A recessing tool according to claim 15 wherein each of said axially extending and radially outwardly extending body members define further slots, cutting means lying in said further slots and extending outwardly therefrom beyond the surfaces of said body members.

References Cited

UNITED STATES PATENTS

| 2,207,067 | 7/1940 | Patscheider | 77—65 |
| 3,230,602 | 1/1966 | Bozek | 77—72 |

FRANCIS S. HUSAR, *Primary Examiner.*

U.S. Cl. X.R.

77—58, 73